Figure 1:
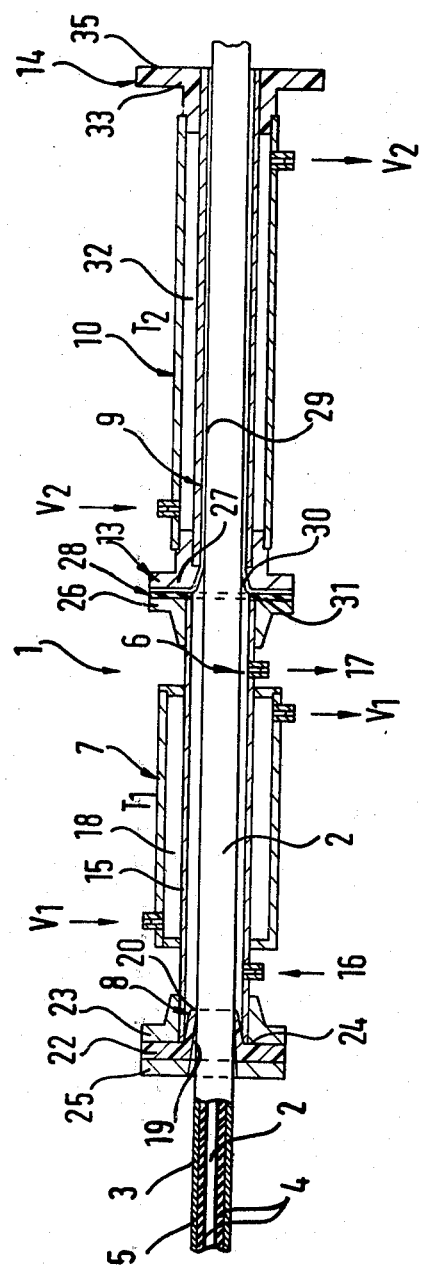

United States Patent [19]

Angioletti, Attilio

[11] 4,178,968

[45] Dec. 18, 1979

[54] PROCESS FOR MANUFACTURING REINFORCED ELASTOMERIC HOSES AND RESULTANT PRODUCT

[75] Inventor: Angioletti, Attilio, Milan, Italy

[73] Assignee: Industrie Pirelli S.p.A., Milan, Italy

[21] Appl. No.: 801,212

[22] Filed: May 27, 1977

[30] Foreign Application Priority Data

Jun. 4, 1976 [IT] Italy ............................ 23928 A/76

[51] Int. Cl.² .................... B29C 25/00; F16L 11/08
[52] U.S. Cl. .................................. 138/126; 264/558; 264/560; 264/347
[58] Field of Search ............... 264/89, 95, 236, 347, 264/209, 558, 560; 425/71; 138/177, 126

[56] References Cited

U.S. PATENT DOCUMENTS

| | | | |
|---|---|---|---|
| 168,088 | 9/1875 | Forsyth | 264/347 |
| 906,489 | 12/1908 | Gammeter | 264/95 X |
| 1,004,865 | 10/1911 | Gammeter | 264/95 |
| 1,152,836 | 9/1915 | Price | 264/89 |
| 1,190,292 | 7/1916 | Hopkins | 264/95 X |
| 2,320,564 | 6/1943 | Brooks | 264/347 X |
| 2,426,341 | 8/1947 | Canfield | 425/71 X |
| 2,525,662 | 10/1950 | Freeman | 264/347 X |
| 2,561,820 | 7/1951 | Ramsey et al. | 425/71 X |
| 3,255,284 | 6/1966 | Meislohn | 264/95 |
| 3,368,017 | 2/1968 | Lister | 264/347 |
| 3,517,097 | 6/1970 | Mixell et al. | 264/347 X |
| 3,645,656 | 2/1972 | Stauffer et al. | 425/71 |
| 3,690,796 | 9/1972 | Borsvold | 264/347 X |
| 4,053,550 | 10/1977 | Taylor | 264/347 |

FOREIGN PATENT DOCUMENTS

955908 4/1964 United Kingdom ............... 264/347

*Primary Examiner*—Philip Anderson
*Attorney, Agent, or Firm*—Stevens, Davis, Miller & Mosher

[57] ABSTRACT

A process is provided for vulcanizing an elastomeric reinforced hose or a hose having its core tube reinforced with fibrous material. In accordance with the process a hose having an elastomeric sheath over its reinforcing material is preferably continuously passed through a tubular preheater which softens the surface of the sheath and the hose is then passed through a heated sizing die where only the surface is initially softened and then vulcanized before leaving the die. The die sizes the diameter of the hose and at the same time smooths out the surface of the sheath. The sized hose is passed immediately into a vulcanizer where it is heated to vulcanize completely. The vulcanized hose is then cooled.

The apparatus provided for practicing the process has, a heated dye, a vulcanizing unit and a unit for cooling the vulcanized hose all connected in series. The apparatus may also have a tubular preheater. The preheater is steam jacketed and may be provided with a means for lubricating the surface of the hose. The sizing dye may be steam jacketed and the vulcanizer may be one which heats the hose with live steam. The vulcanizing unit is provided with a means for separating condensate from the hose and for flowing the condensate out of the vulcanizer. The entrance end of the preheater is sealed by means of an elastomeric sealing ring and an elastomeric sealing member is provided at the exit end of the apparatus. The hose is cooled with cooling water fed into the bore of the cooling member.

11 Claims, 3 Drawing Figures

PROCESS FOR MANUFACTURING REINFORCED ELASTOMERIC HOSES AND RESULTANT PRODUCT

The present invention relates to a process for manufacturing reinforced flexible hoses from elastomeric materials, and more particulary to a process for the continuous vulcanization of these hoses.

In addition, the present invention relates to a device for carrying out the above-mentioned process.

Various processes are known for the vulcanization of flexible hoses having different diameters.

One known process consists of forming a hose on a flexible spindle with the classic operations of braiding or helicoidally winding of the strengthening threads about the core tube.

Subsequently the hose, after having been wound with strips of fabric in order to withstand the forces of vulcanization, is placed with the spindle in an autoclave.

In a final phase, after vulcanization, the spindle is removed and the strip of fabric is unwound.

As it may be easily understood, this type of process is carried out discontinuously and is hence expensive.

Another known process consists of covering the hose, which is already formed, with a lead sheath, and of vulcanizing it in an autoclave where the hose is kept under an internal pressure.

When vulcanization has occurred, the lead sheath is removed. Unfortunately, even this process involves several phases of manual labor which are required to transfer the hose from one manufacturing station to another and, therefore, this is also complex and expensive.

In addition, the process just mentioned has the disadvantage that the removal of the lead sheath, carried out with specific tools, frequently causes the marking of the underlying layers in a way that is clearly visible and often unacceptable.

In particular, then, it may noted that these processes and the latter known processes are not able to supply hoses of any length with a perfect outside diameter and having an external surface which is absolutely smooth, as is often required by the present market. Therefore, an object of this invention is to provide a continuous process for the vulcanization of reinforced elastomer hoses without the above-mentioned disadvantages. Another object of the invention is to provide a process for vulcanizing a hose having fibrous reinforcing material disposed about the core tube of the hose which produces a hose having a smooth surface and of substantially uniform diameter throughout its length.

Figure 2:
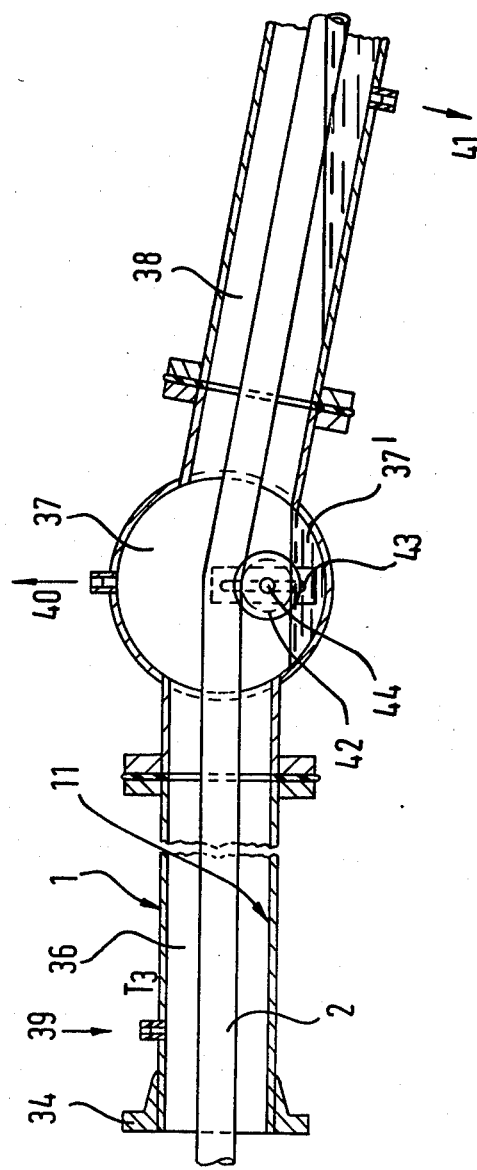
Figure 3:
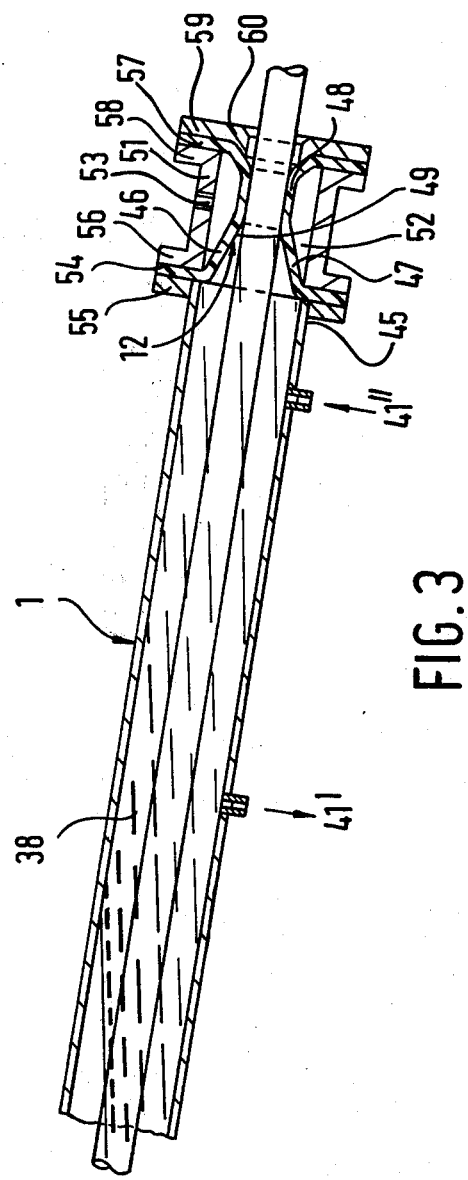

Other objects will become apparent from the following description with reference to the accompanying drawings wherein FIG. 1 illustrates schematically in longitudinal section one embodiment of the first section of the apparatus provided by the invention which includes a preheater, a sizing die and a vulcanizing unit;

FIG. 2 illustrates schematically also in longitudinal section, one embodiment of a second section of the apparatus provided by the invention adapted to be secured to the downstream end of the first section and having a vulcanizing unit; and FIG. 3 illustrates schematically in longitudinal section a third unit of the apparatus of the invention for cooling the vulcanized hose.

The objects of the present invention are accomplished by providing a continuous process and apparatus for the manufacture of elastomeric hoses having a reinforcing structure which includes feeding the hose in the crude uncured state while supported internally by fluid under pressure through the following steps, each of which is executed in a stationary position in respect to the movement of the hose and each one in a different position from the other along the hose's axis while the hose advances without interruption of its movement:

(a) applying at the same time over the whole external surface of the hose being fed, heat, and mechanical compression pressure and controlling the heat and the pressure for vulcanizing at least partially the radially outermost part of the hose and maintaining the remaining part of the hose, internally of the outermost part, in a crude state; and thereafter (b) vulcanizing totally the hose; the process being further characterized by the following step of:

maintaining the pressure around the hose, during steps (a) and (b) and, if necessary, between steps (a) and (b), at a point where it is greater than the vapor pressure of any volatile elements which might be present in the elastomeric material of the hose, or greater than the pressure of the occluded air.

The invention thus provides a process for the manufacture of hoses which has the advantage of being continuous.

In fact, the hose in the crude state, already provided with the reinforcement structure, is fed continuously without interruption of its movement, and, even before being completely vulcanized, it undergoes, as will be explained hereafter, perfect gauging and smoothing of the external surface.

The subsequent vulcanization sets or stabilizes the hose definitively in the shape given to it in the preceding stage of incipient curing of its surface. Therefore, a finished product is obtained which is highly appreciated by the market.

This excellent result arises from the simultaneous application to the non-vulcanized hose of a thermal effect and a mechanical effect. The thermal effect, that is the application of heat, initially leads to a state of softening and then of incipient curing of the outermost parts of the hose, i.e., those radially above the reinforcement structure, while the mechanical effect, that is compression, applied simultaneously to the thermal one, favors the transfer of heat from outside towards the surface layer of the hose and at the same time, while the condition of softening occurs, determines an easy contraction of the hose to the required outside diameter.

Since the thermal and mechanical effects remain unaltered in time and in space as the hose is fed, it is insured that the contraction of the outside diameter is equal along the whole length of the hose and hence a uniform outside diameter is finally obtained. Moreover, in step (a), the outermost layers of the elastomeric hose tend to slide in relation to an optionally present rigid external surface applied around the hose and also in relation to the remaining part internal of the hose which is crude thus inducing surface smoothing when hot. In this case the outermost layers of the elastomeric hose may be considered also as equivalent to a lubricant substance which favors the movement of the hose compressed by mechanical pressure on its external surface.

The next step (b), that is total vulcanization of the hose, including the inside, but without having any effect on the external surface of the hose, allows it to advance at a speed determined solely by the need to give the elastomeric material the required chemical and physical properties.

Therefore the length of the hose produced continuously by the process of the invention may be any length desired and in particular, may be greater than that obtainable with previouslyknown processes. Moreover, the process of the invention guarantees that an excellent product is obtained even when the hose, in the crude state, contains volatile elements within the elastomeric material, in particular; possible traces of moisture incorporated therein during previous operations of extrusion or application of the reinforcement structure, especially if this structure is made up of textile materials.

In fact, in accordance with the principle of the invention, the process includes the last step (c) in accordance with which the pressure around the hose is maintained above the vapor pressure or the volatile elements present in the elastomeric material mixture to prevent, as the hose completes step (a) and begins and continues step (b), blistering in the smoothed outermost surface layer. Preferably, the process of the invention is characterized by the fact that in stage (a), the pressure and heat are controlled in order to completely vulcanize the external surface of the hose. This preferred embodiment of the process provides an external surface which is impervious and especially smooth and thus improves considerably the external appearance of the hose to an extent not possible with other processes. The partial or total vulcanization during step (a) of the outermost layers may also be considered as a stage of scorching of the external surface of the hose which forms a film or pellicle of material around the hose which is particularly smooth.

In particular then, it has been found that total vulcanization of the external surface of the hose produces an increased speed of production in that the vulcanized and already smoothed layer facilitates feeding of the hose even if it is subjected to strong radial compression forces during the feeding operation.

In a preferred embodiment of the process, the hose is vulcanized with live steam; that is with steam circulating under pressure in an enclosed area about the hose as it is fed continuously into the steam zone.

In accordance with a variation in the process, a liquid luricating substance is used during step (a); e.g., oil, which is in contact with the outside surface of the hose. The pressure of the liquid lubricating substance is maintained so that it is lower than the pressure around the hose during the subsequent vulcanizing stage.

This result is obtained by controlling the steam pressure where a live steam vulcanizer is used. In this way it is possible to reduce further any possible friction acting on the hose as it is fed during stage (a), at the same time preventing the presence of the lubricating oil in the vulcanization stage with the subsequent elimination of the disadvantage of flaws in the elastomeric material, which are often to be found during this stage because of the presence of lubricant.

In accordance with a preferred embodiment, the process is characterized by the fact that the hose is preheated before step (a) to a temperature which, as it will be understood, is not greater than that of the subsequent step (a) in which the scorching of the outermost layers of the hose occurs.

A further object of the invention is to provide an apparatus for the continuous manufacture of elastomeric hoses with reinforcing structure, characterized by the fact that it includes a smoothing and gauging die with a through bore, the diameter of which is smaller than the outside diameter of the hose in the crude state, means of heating the die, a vulcanizer, means of introducing and maintaining a fluid under pressure inside the hose and supporting it, means of sealing between the die and vulcanizer, and means of sealing the apparatus about the hose leaving the vulcanizer. Preferably the vulcanizer is a live steam system.

Still in the preferred embodiment, the device is characterized by the fact that it includes a preheater for the hose in the crude state located up-stream of the smoothing die and connected to the die with suitable means of sealing, with further means of sealing about the hose at the inlet to the preheater, and means of heating the preheater. The present invention will be more fully understood from the following detailed description given as an example and hence not restrictive, with reference to FIGS. 1, 2 and 3 which show schematically a device for vulcanizing hoses in one embodiment seen in various sections along the length.

The continuous process for the manufacture of hoses in accordance with the invention in the preferred embodiment is the following.

First of all the core of the hose is produced by extrusion of an elastomeric material, the reinforcement structure is arranged on this core and an external layer of elastomeric material is applied by extrusion and known manufacturing processes and are herein omitted either because they are not an integral part of the invention, or for greater simplicity of description.

In particular, it is pointed out that the reinforcing structure may be of any known type, of metal or textile material, artificial or synthetic, and in accordance with an arrangement such that the fibers, wires or threads lie longitudinally with respect to the axis of the hose and/or with helicoidal winding around the hose. Also applicable are reinforcing structures of non-woven fabric based on the materials indicated above.

Such reinforcing structures have, as is known, the function of allowing tension during manufacture avoiding unacceptable elongation of the hose in use, and of absorbing the stresses acting on the hose in operation.

The present description begins with reinforced hose produced by conventional processes. That is, with the reinforcement structure already covered with an external layer of elastomeric material and supported internally by air or other fluid under pressure and pulled along in a forward movement. From this point on, the following steps occur continuously. The hose is subjected to a preheating operation to ease the subsequent stage of gauging the diameter and smoothing the external surface, during which its circular sections of a determined axial length of the hose are subjected simultaneously to radial compression forces and the transmission of heat. This stage is controlled in order to vulcanize at least partially only the radially outermost elastomeric layers of the hose. That is, at the beginning of the phase, the already preheated outermost elastomeric layers undergo an instantaneous increase in temperature by heat transmission accompanied by compression of the hose from the outside towards the inside, the hose being supported internally by air under pressure. During this phase the hose continues to move forward with the radially outermost parts in a state of plasticity so that the continuous action of the compression results in gauging and smoothing of the external surface of the hose. At the end of this phase the hose, the temperature and pressure to which it has been subjected having been controlled, emerges with the radially outermost layers vulcanized.

In a further phase, the hose is totally vulcanized in live steam. In FIGS. 1, 2 and 3 of the drawing are shown, respectively, the initial section, the intermediate one, and the final section of the apparatus provided for practicing the continuous process of the invention. The apparatus 1, shown in the drawing of a preferred embodiment, is described below with reference to the manufacture of a hose 2 having a reinforcement structure 3 formed for example by threads of textile material interwoven and embedded between an internal elastomeric layer 4 and an external one (sheath) 5 and of threads of textile material arranged in a longitudinal direction which are necessary for moving the hose. The hose 2 supported internally by air under pressure moves forward from left to right in FIGS. 1, 2 and 3 through the device 1, being drawn by a suitable traction system not shown since it may be of any known type.

The apparatus 1 includes a preheater 6 (FIG. 1) having jacketed tube 7 and sealing member 8 disposed around the hose 2 at the entrance to the preheater. A die 9 for gauging and smoothing the hose is provided with heating means 10 for heating the die. A live steam vulcanizer 11 (FIGS. 2 and 3) has a means for sealing around the hose 2 at the outlet from the vulcanizer 11. The preheater, die and vulcanizer are connected to each other with adequate sealing means 13, 14 (FIG. 1).

In particular, the preheating means 7 (FIG. 1) includes a cylindrical member 15 having the inside diameter of its bore greater than the outside diameter of the hose in the crude state, aperture 16 for introduction of a liquid under pressure into the jacket, a second aperture 17 for removing liquid from the jacket, and an annular chamber 18 which is arranged around the tubular member 15 in which steam circulates for heating the liquid.

In a special embodiment of the invention, the liquid may be a lubricant.

Sealing member 8 for sealing the bore around the hose at the inlet to the preheater includes a frusto-conical tubular member 19 of elastomeric material having a circular base 20 which is considerably smaller in diameter than the crude hose and a larger base 21 connected to an annular flange 22. The frusto-conical member 19 is connected to the preheater by having its flange 22 clamped between a first flange 23 at the end 24 of the container and a second external flange 25.

The die 9 (FIG. 1) is connected to the preheater 6 with sealing member 13 having circular flanges 26 and 27 of the die and of the preheater, respectively. An elastomeric gasket or sealing ring 23 resistant to temperature and to the liquid substances used is clamped between flanges 26 and 27. The die is made of stainless steel having a bore 29 through its center, the inside diameter of which is smaller than or at most equal to the minimum outside diameter of the crude hose. This bore 29 ends with a frusto-conical opening 30 having a larger base 31 equal to the inside diameter of the tubular member 15 which is part of the preheater 6. The walls of the central bore 29, especially when the preheating liquid is not a lubricant, may be lined with material which is suitable for reducing the friction between the hose and die, such as, for example, polytetrafluoroethylene, which is also reinforced with fibers such as glass fibers or with material made from these fibers. The heating member 10 comprises an annular chamber 32 surrounding the die, in which heating steam $V_2$ is circulating.

As is clearly visible in FIG. 2, the live steam vulcanizer 11 is arranged immediately after the die. Vulcanizer and die are connected together with the sealing member 14 comprising, between the respective flanges 33 and 34 (FIGS. 1 and 2) an elastomeric sealing member 35 which is resistant to the conditions of temperature and pressure of the water vapor in the vulcanizer. Flanges 33 and 34 may be fastened together with screws. The live steam vulcanizer 11 comprises a first cylindrical shell 36 (FIG. 2) having a outside diameter which is considerably larger than that of the hose, a second spherical shell 37 with base 37' for collecting liquid which condenses, a third cylindrical shell 38 at a constant slope having its axis inclined downwardly in relation to the horizontal axis of the first cylindrical shell 36. The constant slope of the third shell 38 allows the condensed liquid to flow towards the base of the third shell (FIG. 3), thereby removing it as soon as it is formed from the vulcanization area and allowing the steam to be maintained at the temperature required for good vulcanization.

The entry and exit of the steam to and from the vulcanizer occurs through the openings 39 and 40 (FIG. 2) in the first and second shell, while suitable pipes 41, 41' and 41" are provided in the third shell 38 (FIG. 3) with the aim of controlling the vulcanization temperature, and for circulating water for cooling the hose, respectively. Inside the second shell 40 (FIG. 2) is further provided a pulley 42 to support the hose while it passes from the first to the third shell. The pulley may be fixed in a preferred position by sliding and subsequently securing the relative spindle 44 in a suitable slide 43. At the end 45 of the third shell 38 of the vulcanizer sealing member 12 is arranged around the hose leaving the vulcanizer. Sealing member 12 comprises two half-rings 46 and 47 (FIG. 3) of elastomeric material forced against the external surface of the hose by fluid under pressure, for example, air.

In particular, the half-rings when joined together form a first cylindrical section 48 intended to rest as a seal on the hose without damaging it, as it is made of elastomeric material, and a second frusto-conical section for connection between the first section and the end 45 of the third shell of the vulcanizer. Externally and all around the two half-rings is located a cylinder 51 in such a way as to form a closed space into which air flows under pressure through a channel 53 fitted on the wall of the cylinder 51. The two half-rings are then fixed to the vulcanizer having a first circular flange 54, clamped between flanges 55 and 56 of the vulcanizer and of the cylinder 51 and a second circular flange 57 between flanges 58 and 59 of the cylinder 51 and of an end plate 60.

The operation of the above-described device is as follows:

The hose 2 which is already provided with reinforcing material about a core tube is drawn continuously from left to right as shown in FIGS. 1, 2 and 3.

The hose, when passing through the preheater 6 (FIG. 1) undergoes initial heating by coming into contact with the hot liquid being circulated under pressure in the tubular member 15.

During passage of the hose the volatile components present in the compound do not cause blisters in the external surface since the liquid is circulated in member 15 at a pressure which is greater than the steam pressure of the volatile components at the temperature of the hose.

During the feeding process, the hose gradually enters the die 9, being encouraged in this movement both by the frustoconical opening 30 and by the fact of having been preheated.

In the event of the liquid in the container also being a lubricant, the feeding process of the hose through the through bore 29 of the die is further encouraged since the movement of the hose draws with it the lubricant and a film of lubricant is formed between the die and the external surface of the hose.

The hose passing through the die undergoes intense heating and a reduction in diameter to the dimensions determined by the diameter of the through bore 29 with smoothing of the external surface. The passage of the hose in the die is controlled in order that the heat transmitted by the steam in the annular chamber 32 causes at least a partial vulcanization of the outermost layers of the hose whereas the remaining part of the hose internally of the outermost layers remains in a crude state. After the step of scorching and upon leaving the die the hose has a surface which is free from pores and is absolutely regular, whatever the state of the initial elastomeric material, in particular even if this was formed of compounds coming from reject material.

The movement of the hose continues from the die towards the inside of the live steam vulcanizer (FIG. 2).

During vulcanization the steam is maintained at a pressure which is slightly above the pressure of the lubricant channel between hose and die so that a simple pressure difference causes a similar effect to that of an oil scraper ring at the first end of the die and avoids advantageously the damaging presence of lubricating substances inside the vulcanizer, this being a cause, as has already been said, of deterioration in the external layer of the hose.

Moreover, still in the vulcanizer the steam conditions are controlled so that the pressure at the vulcanizing temperature is greater than the steam pressure of the volatile components contained in the body of the hose and therefore guarantees that the surface of the hose smoothed by the die is not subsequently altered by the occurrence of blisters.

During the passage through the vulcanizer the hose is maintained at a distance from the walls, remaining supported when emerging from the die 9, on pulley 42 (FIG. 2) and at the end of the third shell passing between the sealed half-rings 46 and 47 (FIG. 3).

In these conditions, therefore, the hose is prevented from coming into contact with the coldest walls of the shell from the beginning of the first shell 36 up to part of the third shell 38, and from undergoing therefore an imperfect vulcanization.

In the following length of the third shell 38 of the vulcanizer the hose, before leaving under atmospheric pressure through the half-rings 46 and 47, is cooled with water circulating through the tubes 41' and 41" (FIG. 3).

It is apparent from the description herein that the apparatus of the invention produces hose of any length required and having various diameters simply by using dies with through bores of correspondingly different diameters.

For example, the device may be used with a die suitable for gauging and smoothing a reinforced elastomeric hose having a diameter of from 18.2 mm to a diameter of 17.5 mm.

Although some embodiments of the present invention have been illustrated and described, it is intended that all possible variation which are accessible to an expert should be included in its scope. For example, superheated steam, hot air or any other suitable inert preheated fluid may be used in the vulcanizer. Likewise, any suitable means which move with regard to the walls of the die may be used in the die to facilitate the advancement of the hose such as, for example, belts or movable surfaces or like elements.

What is claimed is:

1. A process for vulcanizing a hose of elastomeric material provided with a reinforcing structure embedded in its wall comprising the steps of smoothing and completely vulcanizing the external surface of the hose while all the elastomeric material of the hose itself is substantially mantained in an uncured state, and subsequently vulcanizing the remaining uncured elastomeric material forming said hose.

2. The process of claim 1, wherein during said phase prior to the subsequent vulcanization, the heat and pressure for the total vulcanization of the external surface of the hose are controlled.

3. The process of claim 2, wherein the subsequent vulcanization is carried out in live steam.

4. The process of claim 1, wherein a lubricating substance is introduced in contact with the external surface of the hose and the pressure of the lubricating substance is maintained below that which exists around the hose during the following phase of vulcanization.

5. The process of claim 1, wherein the hose is initially preheated to a temperature which is lower than that to which it is later subjected.

6. The process of claim 5, wherein said preheating is carried out by circulating a hot liquid substance around the external wall of the hose.

7. The process of claim 6, wherein said liquid substance is a lubricant.

8. The process of claim 1 wherein the hose is heated to vulcanize it by means of an inert pre-heated fluid.

9. The process of claim 8 wherein the said fluid is superheated steam or hot air.

10. The process of claim 1 wherein the hose is moved through a die with a movable surface to size it prior to vulcanization.

11. Reinforced flexible hose made from elastomeric material by the process of claim 1.

* * * * *